3,049,502
PROCESS OF INCREASING THE PARTICLE SIZE OF SYNTHETIC LATEX BY ADDING POLYVINYL METHYL ETHER TO A LATEX CONTAINING SALT ELECTROLYTE AND UNREACTED MONOMER
Louis H. Howland, Watertown, and Victor S. Chambers, Naugatuck, Conn., assignors to United States Rubber Company, New York, N.Y., a corporation of New Jersey
No Drawing. Filed Jan. 28, 1960, Ser. No. 5,099
11 Claims. (Cl. 260—17.4)

This invention relates to the preparation of synthetic rubber latices of large particle size, particularly to permit them to be concentrated to fluid latices of high solids content.

We have found that treating a synthetic rubber latex containing an alkali salt electrolyte and unreacted polymerizable monomeric material with a small amount of polyvinyl methyl ether at a temperature from 0° C. to 15° C. before removing the unreacted monomeric material, results in a latex having a greatly increased particle size over the same latex containing the alkali salt electrolyte without the polyvinyl methyl ether treatment. Such latices that have been treated with polyvinyl methyl ether in the presence of an alkali salt electrolyte and the unreacted monomers may readily be concentrated, preferably by evaporation concentration, to fluid high solids latices.

In carrying out the present invention, the emulsion of synthetic rubber forming monomers is polymerized to a latex of a conversion of 60% to 95%, and the latex is treated with 0.001% to 1% of polyvinyl methyl ether and 0.2% to 2% of alkali salt electrolyte, said percentages being based on the weight of the solids of the latex, at a temperature of 0° C. to 15° C. in the presence of at least 5% of unreacted polymerizable monomers based on the weight of the solids of the latex, after which the unreacted polymerizable monomers are removed. The polyvinyl methyl ether may be added to the latex with or after the shortstopping agent after the desired conversion of 60% to 95%, and the residual monomers may then be removed. If the polyvinyl methyl ether is added to the initial emulsion of monomers, it may be in contact with the latex for a time to carry out the polymerization generally not more than 24 hours. The polyvinyl methyl ether may be added at any intermediate stage of the polymerization. The alkali salt electrolyte may be included in the polymerization recipe or may be added to the latex at any time before the polyvinyl methyl ether or may be added with the polyvinyl methyl ether. Such 0.2% to 2% of alkali salt electrolyte is in addition to the very small amounts of electrolyte that may be present in the latex from the catalysts, activators, sequestering agents, oxygen scavengers, emulsifiers and stabilizers from the polymerization recipe. The temperature of the treatment with polyvinyl methyl ether should be between 0° C. and 15° C. since treatments at higher temperatures do not give appreciable increase in particle size. Therefore, the invention is particularly useful in low temperature polymerizations between 0° C. and 15° C., since it is difficult to cool a high temperature polymerization batch for treatment with polyvinyl methyl ether before stripping unreacted monomers. The unreacted monomers present with the polyvinyl methyl ether may be all the unreacted monomers after the desired conversion or only part of them as where volatile monomers, such as butadiene-1,3 are vented from the latex before addition of the polyvinyl methyl ether, provided at least 5% of higher boiling monomers, such as styrene, remain for the polyvinyl methyl ether treatment, after which such higher boiling monomers may be stripped from the latex as by steam distillation. With 60% to 95% conversion and retaining all the unreacted monomers in the latex, the range of monomers in the latex is from 5% to 67% based on the solids of the latex. The latex will conventionally have a solids content of 20% to 50% and may be concentrated to a solids content of 55% to 70%, giving a fluid high solids latex. The latex may be concentrated by increasing the solids content in known manner as by creaming with a vegetable mucilage, such as ammonium alginate. It is preferred however, to increase the solids content by evaporation concentration. Unreacted monomers may be stripped from the latex by the evaporation concentration.

Polyvinyl methyl ethers are generally graded by specific viscosity which is a measure of average molecular weight. Polyvinyl methyl ethers having a specific viscosity from 0.015 to 1.1, which corresponds to average molecular weights in the range from 160 to 6000, may be used in the present invention. The preferred polyvinyl methyl ethers are those having specific viscosities between 0.1 and 1.1 which corresponds to molecular weights in the range from 4000 to 6000. While the amount of polyvinyl methyl ether may be from 0.001 to 1 part per 100 parts of latex solids, the preferred range is 0.01 to 0.5 part per 100 parts of latex solids. The alkali salt electrolyte may be an alkali (potassium, sodium, ammonium or amine) salt of an acid such as carbonic, formic, acetic, sulfuric, hydrochloric, nitric or phosphoric acids. Examples of alkali salt electrolytes that may be used in the present invention are ammonium carbonate, ammonium bicarbonate, methyl amine carbonate, dimethyl amine carbonate, sodium formate, potassium acetate, sodium sulfate, potassium sulfate, sodium chloride, potassium chloride, sodium nitrate, and trisodium phosphate.

The synthetic rubber latex may be an aqueous emulsion polymerizate of one or more butadienes-1,3, for example, butadiene-1,3, 2-methylbutadiene-1,3 (isoprene), 2,3-dimethyl-butadiene-1,3, piperylene, or a mixture of one or more such butadienes-1,3, with one or more other polymerizable compounds which are capable of forming rubbery copolymers with butadienes-1,3, for example, up to 70% by weight of such mixture of one or more monoethylenic compounds which contain a $CH_2=C<$ group where at least one of the disconnected valences is attached to an electro-negative group, that is, a group which substantially increases the electrical dissymmetry or polar character of the molecule. Examples of compounds which contain a $CH_2=C<$ group and are copolymerizable with butadienes-1,3 are aryl olefines, such as styrene, vinyl toluene, alpha methyl styrene, chlorostyrene, dichlorostyrene, vinyl naphthalene; the alpha methylene carboxylic acids and their esters, nitriles and amides, such as acrylic acid, methyl acrylate, methyl methacrylate, acrylonitrile, methacrylonitrile, methacrylamide; vinyl pyridines, such as 2-vinyl pyridine, 2-methyl-5-vinyl pyridine; methyl vinyl ketone; vinylidene chloride. Such a synthetic rubber latex may be termed a "butadiene polymer synthetic rubber latex." The latices will contain dispersing agents from the polymerization generally in amount from 2% to 10% by weight of the solids of the latex of one or a mixture of anionic surface-active dispersing agents. Such anionic surface-active dispersing agents may be water-soluble soaps of soap-forming monocarboxylic acids, such as alkali-metal, ammonium or amine salts of higher fatty acids having 10 to 24 carbon atoms in the molecule or of rosin acids, including hydrogenated, dehydrogenated and disproportionated rosin acids. The anionic surface-active dispersing agents may be sulfonated or sulfated compounds having the general formula $R—SO_3M$ or $R—OSO_3M$, where M represents alkali-metal, ammonium or amine radical, and R represents an organic radical containing a group having 9 to 23 carbon atoms, such as alkyl sulfonates, e.g. dodecyl sodium sulfonate; alkyl sulfates, e.g. sodium oleyl sulfate; alkyl aryl sulfonates, e.g. dodecyl benzene sulfonate; alkyl sulfosuccinates, e.g. dioctyl sodium sulfosuccinate; aryl sulfonate-formaldehyde condensation products, e.g. condensation product of sodium naphthalene sulfonate and formaldehyde.

The following examples illustrate the invention. All parts and percentages referred to herein are by weight.

*Example 1*

In run A, a 24-ounce glass bottle reactor was loaded with the following ingredients: 70 parts of butadiene-1,3; 30 parts of styrene; 0.20 part of sodium formaldehyde sulfoxylate; 0.15 part of di-isopropylbenzene hydroperoxide; 0.015 part of ferrous sulfate heptahydrate; 0.030 part of the tetrasodium salt of ethylene diamine tetraacetic acid; 3.0 parts of potassium oleate; 1 part of a condensation product of sodium naphthalene sulfonate and formaldehyde dispersing agent; 0.5 part of sodium sulfate; 0.03 part of sodium dithionite, 0.1 part of tertiary dodecyl mercaptan; and 130 parts of water. The mixture was agitated by end over end rotation at 5° C. The conversion of the monomers into polymer was followed by periodically measuring the percent solids of the polymerizing system. When the conversion had reached approximately 68%, a solution of 0.5 part of a condensation product of sodium naphthalene sulfonate and formaldehyde dispersing agent in 20 parts of water was added. The polymerization was allowed to proceed until 87% conversion was reached when it was shortstopped with 0.2 part of potassium dimethyldithiocarbamate. Unreacted butadiene was vented off. The average particle diameter of the latex was 580 Angstrom units.

Run B was similar to run A except that the 0.5 part of the condensation product of sodium naphthalene sulfonate and formaldehyde and 20 parts of water were added at approximately 73% conversion, and the polymerization was shortstopped at 85% conversion. After venting off the unreacted butadiene, the average particle diameter of the latex was 560 Angstrom units.

The latices from runs A and B were mixed, and steam distilled to strip off the residual monomeric styrene, and then concentrated by evaporation concentration in a laboratory disc concentrator at 35° C.–40° C. to a solids content of 43.5%. The latex of 43.5% solids content had a viscosity of 3,500 centipoises measured at approximately 25° C.

Run C was similar to run A except that at 61% conversion 0.5 part of polyvinyl methyl ether (as 10% aqueous solution) and 0.5 part of a condensation product of sodium naphthalene sulfonate and formaldehyde and a total of 20 parts of water were added, and the polymerization was shortstopped at 77% conversion. The polyvinyl methyl ether used had a specific viscosity of 0.62. After venting off the unreacted butadiene, the average particle diameter of the latex was 1640 Angstrom units.

Run D was similar to run C except the polyvinyl methyl ether, and condensation product of sodium naphthalene sulfonate and formaldehyde, and water were added at approximately 63% conversion, and the polymerization was shortstopped at 75% conversion. After venting off the unreacted butadiene, the average particle diameter of the latex was 1640 Angstrom units.

The latices from runs C and D were mixed, and steam distilled to strip off the residual unreacted monomeric styrene, and then concentrated by evaporation in a laboratory disc concentrator at 35° C.–40° C. to a solids content of 72%. The latex of 72% solids content had a viscosity of 1300 centipoises measured at approximately 25° C., as compared to a viscosity of 3,500 centipoises for the latex of 43.5% solids content without the polyvinyl methyl ether addition before removing residual monomers.

*Example 2*

In run E, a 24-ounce glass reactor was loaded with the following ingredients: 70 parts of butadiene-1,3; 30 parts of styrene; 0.20 part of sodium formaldehyde sulfoxylate; 0.15 part of di-isopropylbenzene hydroperoxide; 0.015 part of ferrous sulfate heptahydrate; 0.030 part of the tetrasodium salt of ethylene diamine tetracetic acid; 4.0 parts of potassium oleate; 1 part of a condensation product of sodium naphthalene sulfonate and formaldehyde dispersing agent; 1.5 parts of potassium sulfate; 0.03 part of sodium dithionite; 0.1 part of tertiary dodecyl mercaptan; and 130 parts of water. The polymerization was run at 5° C. using the procedure described in Example 1. When the conversion had reached approximately 72% it was shortstopped with 0.2 part of potassium dimethyldithiocarbamate. Unreacted butadiene was vented off. The average particle diameter of the latex was 1220 Angstrom units.

Run F was similar to run A except that 0.5 part of polyvinyl methyl ether (as 10% aqueous solution) was added at 73% conversion at about the same time as the shortstop. The polyvinyl methyl used had a specific viscosity of 0.028. The reactor was kept at 5° C. for about one hour prior to venting the butadiene. The average particle diameter of the latex was 2000 Angstrom units.

Run G was similar to run F except that 0.5 part of polyvinyl methyl ether with a specific viscosity of 0.59 was added at 76% conversion at about the same time as the shortstop. After venting off the butadiene, the average particle diameter of the latex was 1880 Angstrom units.

Run H was similar to run F except that 0.5 part of polyvinyl methyl ether with a specific viscosity of 0.62 was added at 74% conversion at about the same time as the shortstop. After venting off the butadiene, the average particle diameter of the latex was 1810 Angstrom units.

*Example 3*

In run J, a 24-ounce glass bottle reactor was loaded with the following ingredients: 70 parts of butadiene-1,3; 30 parts of styrene; 0.20 part of sodium formaldehyde sulfoxylate; 0.15 part of di-isopropylbenzene hydroperoxide; 0.015 part of ferrous sulfate heptahydrate; 0.030 part of the tetrasodium salt of ethylene diamine tetraacetic acid; 3.0 parts of potassium oleate; 1.0 part of potassium disproportionated rosin soap; 1.8 parts of a condensation product of sodium naphthalene sulfonate and formaldehyde dispersing agent; 1.6 parts of potassium sulfate; 0.03 part of sodium dithionite, 0.1 part of tertiary dodecyl mercaptan; and 130 parts of water. The polymerization was run at 5° C. using the procedure described in Example 1. When the conversion had reached approximately 82%, it was shortstopped with 0.2 part of potassium dimethyldithiocarbamate. Unreacted butadiene was vented off. The average particle diameter of the latex was 1200 Angstrom units.

Run K was similar to run J except that 0.2 part of polyvinyl ether with a specific viscosity of 0.62 was added at 80% conversion at about the same time as the shortstop. After venting off the butadiene, the average particle diameter of the latex was 1920 Angstrom units.

Run L was similar to run J except that 0.5 part of polyvinyl methyl ether with a specific viscosity of 0.62 was added at 81% conversion at about the same time as the shortstop. After venting off the butadiene, the average particle diameter of the latex was 1920 Angstrom units.

*Example 4*

Three samples of A, B and C of a latex were prepared by polymerizing for 8½ hours at 41° F. a recipe consisting of 150 parts of water, 70 parts of butadiene-1,3, 30 parts of styrene, 3.0 parts of potassium oleate, 1.0 part of the condensation product of sodium naphthalene sulfonate and formaldehyde, 0.15 part of diisopropyl benzene hydroperoxide, 0.2 part of sodium formaldehyde sulfoxylate, 0.015 part of ferrous sulfate heptahydrate, 0.03 part of ethylene diamine tetraacetic acid, 0.03 part of sodium dithionite, and 0.1 part of tertiary dodecyl mercaptan. After polymerizing for the 8½ hours, the conversion of each of the latices was about 80%. Sample A was shortstopped by addition of 24 parts of water containing 0.2 part of potassium dimethyl dithiocarbamate shortstop, 0.2 part of the condensation product of sodium naphthalene sulfonate and formaldehyde, and 1.0 part of potassium oleate. Samples B and C were shortstopped by the addition of the same solution but also containing 0.5 part of a polyvinyl methyl ether having a specific viscosity of 0.4. The unreacted butadiene was vented off and the styrene was removed by steam distillation.

The average particle diameter of the thus treated latex of sample A was 650 Angstrom units, of sample B was 650 Angstrom units and of sample C 610 Angstrom units. Comparison of samples B and C with sample A shows that the polyvinyl methyl ether of itself, i.e. in the absence of alkali salt electrolyte, does not increase the particle size of the latex on removing unreacted monomers in the presence of the polyvinyl methyl ether. The great increase of the particle size of the latex on removing unreacted monomers from a latex containing alkali salt electrolyte in the presence of polyvinyl methyl ether, as shown in Examples 1 to 3, is clearly a synergistic effect.

The latices of increased particle size according to the present invention, particularly of high solids content, may be used in the usual applications of latices, as in foam sponge manufacture, tire cord dipping, bonding and impregnating various materials, preparation of adhesives, and the like.

This application is a continuation-in-part of our application Serial No. 776,669, filed November 28, 1958.

In view of the many changes and modifications that may be made without departing from the principles underlying the invention, reference should be made to the appended claims for an understanding of the scope of the protection afforded the invention.

Having thus described our invention, what we claim and desire to protect by Letters Patent is:

1. The method which comprises treating a synthetic rubber latex which is an aqueous emulsion polymerizate of synthetic rubber forming monomeric material selected from the group consisting of butadiene-1,3, isoprene, 2,3-dimethyl butadiene and piperylene, and mixtures thereof, and mixtures of such butadienes-1,3 with up to 70% by weight of such mixtures of monoethylenic compounds which contain a $CH_2=C<$ group and are copolymerizable with butadienes-1,3, and which have been polymerized to a latex of 60% to 95% conversion, in the presence of at least 5% of residual unreacted polymerizable monomeric material based on the weight of the solids of the latex with 0.001% to 1% of polyvinyl methyl ether and 0.2% to 2% of alkali salt electrolyte selected from potassium, sodium, ammonium and amine salts based on the weight of the solids of the latex at a temperature from 0° C. to 15° C., said polyvinyl methyl ether having a specific viscosity from 0.015 to 1.1, and then removing unreacted monomeric material from the latex.

2. The method which comprises treating a synthetic rubber latex which is an aqueous emulsion polymerizate of synthetic rubber forming monomeric material selected from the group consisting of butadiene-1,3- isoprene,2,3-dimethyl butadiene and piperylene, and mixtures thereof, and mixtures of such butadienes-1,3 with up to 70% by weight of such mixtures of monoethylenic compounds which contain a $CH_2=C<$ group and are copolymerizable wth butadienes-1,3, and which has been polymerized at 0° C. to 15° C. to a latex of 60% to 95% conversion, in the presence of at least 5% of residual unreacted polymerizable monomeric material based on the weight of the solids of the latex with 0.001% to 1% of polyvinyl methyl ether and 0.2% to 2% of alkali salt electrolyte selected from potassium, sodium, ammonium and amine salts based on the weight of the solids of the latex at a temperature from 0° C. to 15° C., said polyvinyl methyl ether having a specific viscosity from 0.015 to 1.1, and then removing unreacted monomeric material from the latex.

3. The method which comprises treating a synthetic rubber latex which is an aqueous emulsion polymerizate of synthetic rubber forming monomeric material selected from the group consisting of butadiene-1,3, isoprene, 2,3-dimethyl butadiene and piperylene, and mixtures thereof, and mixtures of such butadienes-1,3 with up to 70% by weight of such mixtures of monoethylenic compounds which contain a $CH_2=C<$ group and are copolymerizable with butadienes-1,3, and which has been polymerized at 0° C. to 15° C. to a latex of 60% to 95% conversion, in the presence of at least 5% of residual unreacted polymerizable monomeric material based on the weight of the solids of the latex with 0.01% to 0.5% of polyvinyl methyl ether and 0.2% to 2% of alkali salt electrolyte selected from potassium, sodium, ammonium and amine salts based on the weight of the solids of the latex at a temperature from 0° C. to 15° C., said polyvinyl methyl ether having a specific viscosity from 0.015 to 1.1, and then removing unreacted monomeric material from the latex.

4. The method which comprises treating a synthetic rubber latex which is an aqueous emulsion polymerizate of a mixture of butadiene-1,3 and up to 70% of said mixture of styrene, and which has been polymerized at 0° C. to 15° C. to a latex of 60% to 95% conversion, in the presence of at least 5% of residual unreacted polymerizable monomeric material based on the weight of the solids of the latex with 0.001% to 1% of polyvinyl methyl ether and 0.2% to 2% of alkali salt electrolyte selected from potassium, sodium, ammonium and amine salts based on the weight of the solids of the latex at a temperature from 0° C. to 15° C., and said polyvinyl methyl ether having a specific viscosity from 0.015 to 1.1, and then removing unreacted monomeric material from the latex.

5. The method which comprises treating a synthetic rubber latex which is an aqueous emulsion polymerizate of a mixture of butadiene-1,3 and up to 70% of said mixture of styrene, and which has been polymerized at 0° C. to 15° C. to a latex of 60% to 95% conversion, in the presence of at least 5% of residual unreacted polymerizable monomeric material based on the weight of the solids of the latex with 0.01% to 0.5% of polyvinyl methyl ether and 0.2% to 2% of alkali salt electrolyte selected from potassium, sodium, ammonium and amine salts based on the weight of the solids of the latex at a temperature from 0° C. to 15° C., said polyvinyl methyl ether having a specific viscosity from 0.015 to 1.1, and then removing unreacted monomeric material from the latex.

6. The method of making a concentrated synthetic rubber latex which comprises treating a synthetic rubber latex which is an aqueous emulsion of synthetic rubber forming monomeric material selected from the group consisting of butadiene-1,3, isoprene, 2,3-dimethyl butadiene and piperylene, and mixtures thereof, and mixtures of such butadienes-1,3 with up to 70% of such mixtures of monoethylenic compounds which contain a $CH_2=C<$ group and are copolymerizable with butadienes-1,3, and which has been polymerized to a latex of 60% to 95% conversion and a solids content of 20% to 50%, in the presence of at least 5% of residual unreacted polymerizable monomeric material based on the weight of the solids of the latex with 0.001% to 1% of polyvinyl methyl ether and 0.2% to 2% of alkali salt electrolyte selected from potassium, sodium, ammonium and amine salts based on the weight of the solids of the latex at a temperature from 0° C. to 15° C., said polyvinyl methyl ether having a specific viscosity from 0.015 to 1.1, and then removing unreacted monomeric material from the latex and creaming the latex to a solids content of 55% to 70% with a vegetable mucilage creaming agent.

7. The method of making a concentrated synthetic rubber latex which comprises treating a synthetic rubber latex which is an aqueous emulsion polymerizate of synthetic rubber forming monomeric material selected from the group consisting of butadiene-1,3, isoprene, 2,3-dimethyl butadiene and piperylene, and mixtures thereof, and mixtures of such butadienes-1,3 with up to 70% of such mixtures of monoethylenic compounds which contain a $CH_2\!=\!C\!<$ group and are copolymerizable with, and which has been polymerized to a latex of 60% to 95% conversion and a solids content of 20% to 50%, in the presence of at least 5% of residual unreacted polymerizable monomeric material based on the weight of the solids of the latex with 0.001% to 1% of polyvinyl methyl ether and 0.2% to 2% of alkali salt electrolyte selected from potassium, sodium, ammonium and amine salts based on the weight of the solids of the latex at a temperature from 0° C. to 15° C., said polyvinyl methyl ether having a specific viscosity from 0.015 to 1.1, and then removing unreacted monomeric material from the latex and evaporating water from the latex until the latex is concentrated.

8. The method of making a concentrated synthetic rubber latex which comprises treating a synthetic rubber latex which is an equeous emulsion of synthetic rubber forming monomeric material selected from the group consisting of butadiene-1,3-isoprene, 2,3-dimethyl butadiene and piperylene, and mixtures thereof, and mixtures of such butadienes-1,3 with up to 70% of such mixtures of monoethylenic compounds which contain a $CH_2\!=\!C\!<$ group and are copolymerizable with butadienes-1,3, and which has been polymerized at 0° C. to 15° C. to a latex of 60% to 95% conversion and a solids content of 20% to 50%, in the presence of at least 5% of residual unreacted polymerizable monomeric material based on the weight of the solids of the latex with 0.001% to 1% of polyvinyl methyl ether and 0.2% to 2% of alkali salt electrolyte selected from potassium, sodium, ammonium and amine salts based on the weight of the solids of the latex at a temperature from 0° C. to 15° C., said polyvinyl methyl ether having a specific viscosity from 0.015 to 1.1, and then removing unreacted monomeric material from the latex and evaporating water from the latex until the latex is concentrated to a solids content of 55% to 70%.

9. The method of making a concentrated synthetic rubber latex which comprises polymerizing at 0° C. to 15° C. an aqueous emulsion of synthetic rubber forming monomeric material selected from the group consisting of butadiene-1,3, isoprene, 2,3-dimethyl butadiene and piperylene, and mixtures thereof, and mixtures of such butadienes-1,3 with up to 70% of such mixtures of monoethylenic compounds which contain a $CH_2\!=\!C\!<$ group and are copolymerizable with butadienes-1,3, and which has been polymerized to a latex of 60% to 95% conversion and a solids content of 20% to 50%, in the presence of at least 5% of residual unreacted polymerizable monomeric material based on the weight of the solids of the latex with 0.01% to 0.5% of polyvinyl methyl ether and 0.2% to 2% of alkali salt electrolyte selected from potassium, sodium, ammonium and amine salts based on the weight of the solids of the latex at a temperature from 0° C. to 15° C., said polyvinyl methyl ether having a specific viscosity from 0.015 to 1.1, and then removing unreacted monomeric material from the latex and evaporating water from the latex until the latex is concentrated to a solids content of 55% to 70%.

10. The method of making a concentrated synthetic rubber latex which comprises treating a synthetic rubber latex which is an aqueous emulsion of a mixture of butadiene-1,3 and up to 70% of said mixture of styrene, and which has been polymerized at 0° C. to 15° C. to a latex of 60% to 95% conversion and a solids content of 20% to 50%, in the presence of at least 5% of residual unreacted polymerizable monomeric material based on the weight of the solids of the latex with 0.001% to 1% of polyvinyl methyl ether and 0.2% to 2% of alkali salt electrolyte selected from potassium, sodium, ammonium and amine salts based on the weight of the solids of the latex at a temperature from 0° C. to 15° C., said polyvinyl methyl ether having a specific viscosity from 0.015 to 1.1, and then removing unreacted monomeric material from the latex and evaporating water from the latex until the latex is concentrated to a solids content of 55% to 70%.

11. The method of making a concentrated synthetic rubber latex which comprises treating a synthetic rubber latex which is an aqueous emulsion of a mixture of butadiene-1,3 and up to 70% of said mixture of styrene, and which has been polymerized at 0° C. to 15° C. to a latex of 60% to 95% conversion and a solids content of 20% to 50%, in the presence of at least 5% of residual unreacted polymerizable monomeric material based on the weight of the solids of the latex with 0.01% to 0.5% of polyvinyl methyl ether and 0.2% to 2% of alkali salt electrolyte selected from potassium, sodium, ammonium and amine salts based on the weight of the solids of the latex at a temperature from 0° C. to 15° C., said polyvinyl methyl ether having a specific viscosity from 0.015 to 1.1, and then removing unreacted monomeric material from the latex and evaporating water from the latex until the latex is concentrated to a solids content of 55% to 70%.

References Cited in the file of this patent
UNITED STATES PATENTS

| | | |
|---|---|---|
| 2,138,073 | Schweitzer | Nov. 29, 1938 |
| 2,444,801 | Arundale | July 6, 1948 |
| 2,481,876 | Rhines | Sept. 13, 1949 |
| 2,897,168 | Brown | July 28, 1959 |